US007082959B1

(12) United States Patent
Franklin

(10) Patent No.: US 7,082,959 B1
(45) Date of Patent: Aug. 1, 2006

(54) SHUTOFF VALVE SYSTEM WITH LEAK DETECTOR

(76) Inventor: Robert C. Franklin, 15400 Winchester Blvd., #42, Los Gatos, CA (US) 95030

(\*) Notice: Subject to any disclaimer, the term of this patent is extended or adjusted under 35 U.S.C. 154(b) by 0 days.

(21) Appl. No.: 11/385,587

(22) Filed: Mar. 21, 2006

(51) Int. Cl.
*F16K 17/00* (2006.01)
*G01M 3/00* (2006.01)
*G01M 3/04* (2006.01)

(52) U.S. Cl. ............... 137/312; 73/40.5 R; 200/61.04; 340/605; 251/74; 251/294

(58) Field of Classification Search ............ 137/312, 137/68.11; 251/74, 294; 340/604, 605; 200/61.04; 73/40.5 R, 46
See application file for complete search history.

(56) References Cited

U.S. PATENT DOCUMENTS

| | | | |
|---|---|---|---|
| 2,798,503 A | 7/1957 | Carver | |
| 3,920,031 A | 11/1975 | Maxfield | |
| 4,294,276 A * | 10/1981 | Harrison | 73/40.5 R |
| 4,324,268 A * | 4/1982 | Jacobson | 137/312 |
| 4,387,878 A | 6/1983 | Zuksusky | |
| 5,169,117 A | 12/1992 | Huang | |
| 5,632,302 A | 5/1997 | Lenoir | |
| 5,992,218 A * | 11/1999 | Tryba et al. | 73/40.5 R |
| 6,003,536 A * | 12/1999 | Polverari et al. | 137/312 |
| 6,024,116 A | 2/2000 | Almberg | |
| 6,792,967 B1 | 9/2004 | Franklin | |
| 6,950,032 B1 * | 9/2005 | Hewitt et al. | 137/312 |

\* cited by examiner

*Primary Examiner*—Kevin Lee
(74) *Attorney, Agent, or Firm*—Robert Charles Hill

(57) ABSTRACT

A pilot operated shutoff valve system with leak detector for automatically shutting off a water supply to appliances such as a clothes washing machine, dishwashing machine, sink, toilet, or refrigerator equipped with an ice maker, comprising a sealing member movable within said valve body between an open position wherein the sealing member does not block main fluid flow, and a closed position wherein the sealing member blocks main fluid flow.

12 Claims, 6 Drawing Sheets

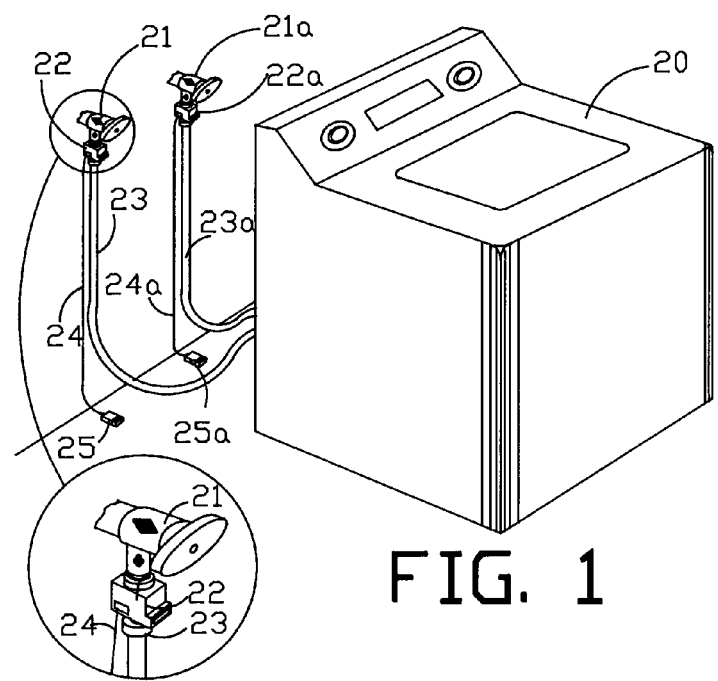
FIG. 1
FIG. 1A
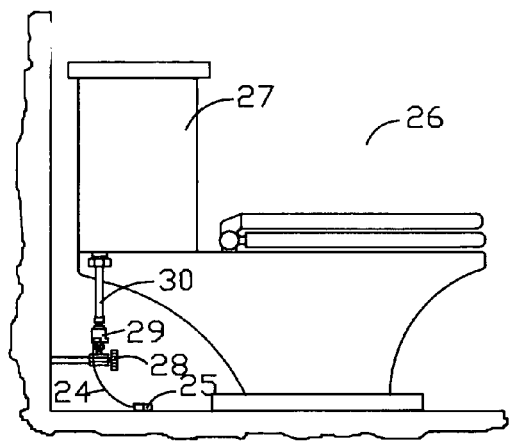
FIG. 2
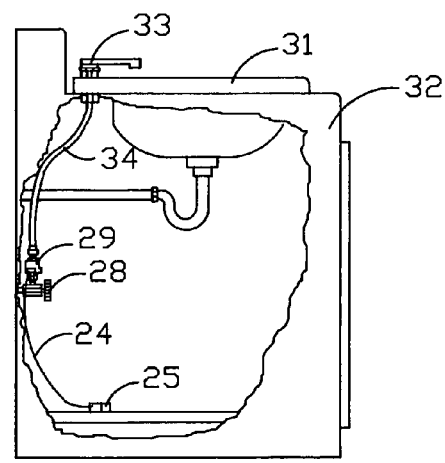
FIG. 3

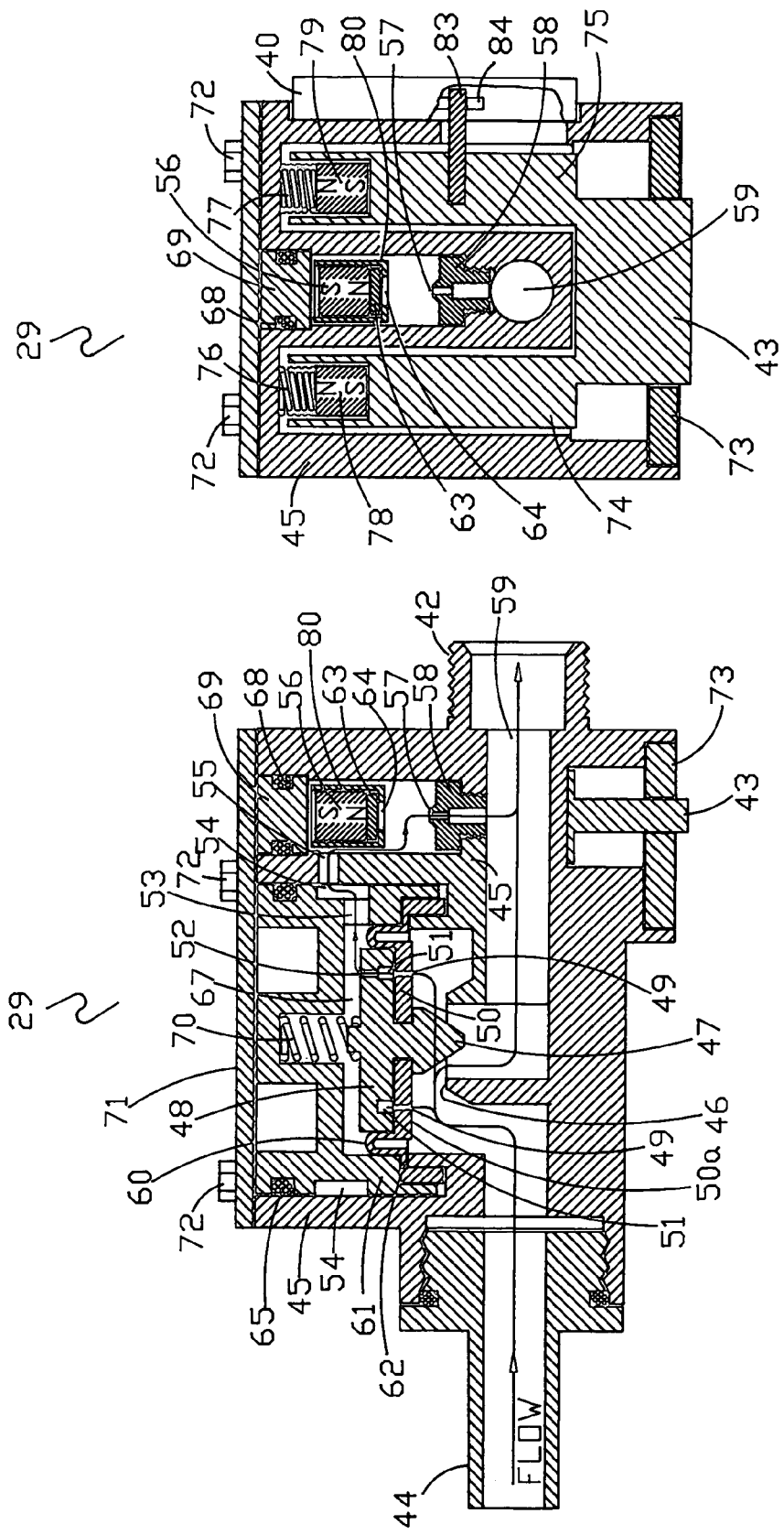

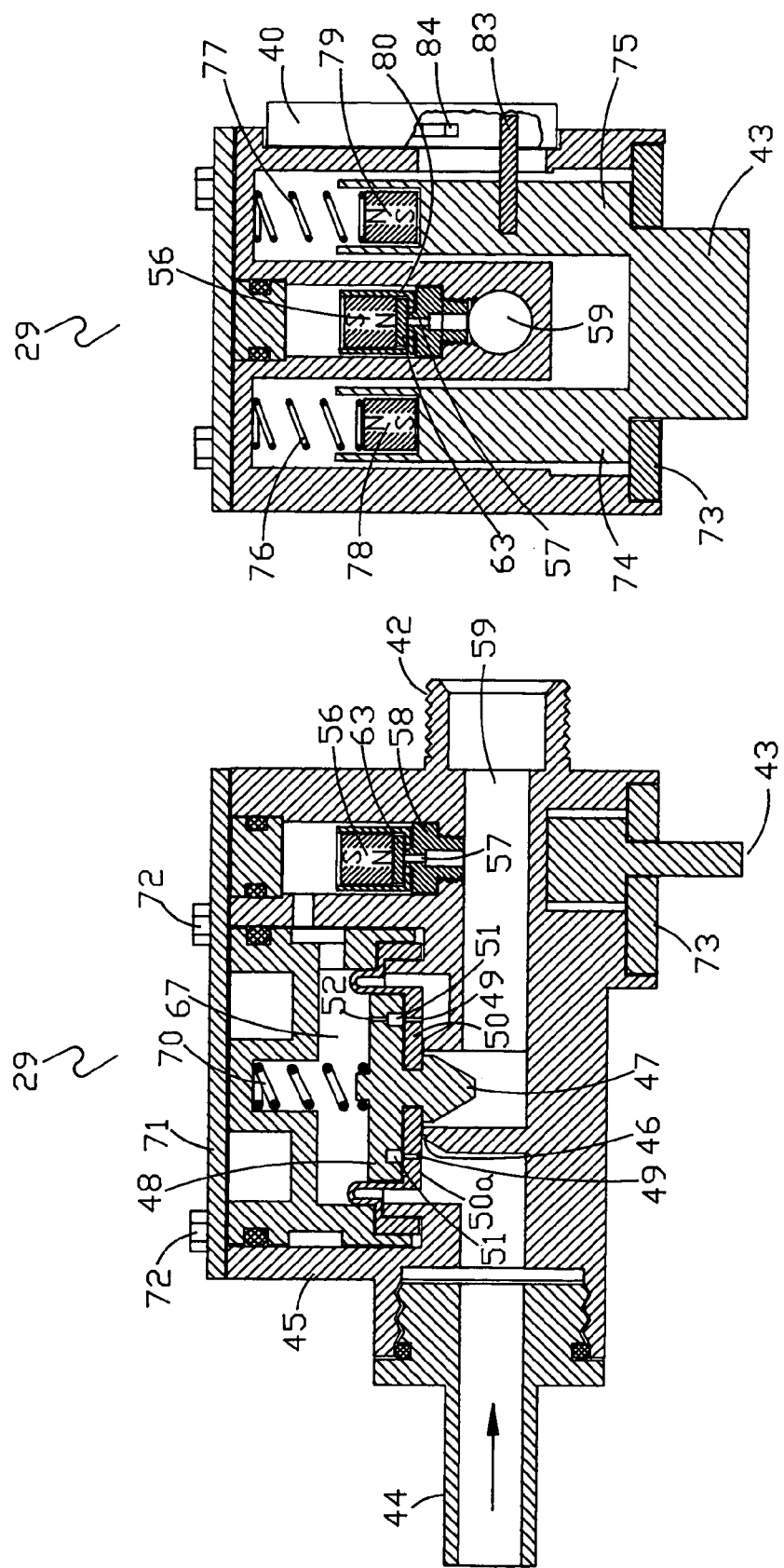

SHUTOFF VALVE SYSTEM WITH LEAK DETECTOR

FIELD OF INVENTION

This invention relates to a pilot operated valve system that will detect the presence of a water leakage and turn off the associated valve in order to stop the flow of the water, thus avoiding significant property damage. More particularly the invention pertains to such applications as clothes washing machines, dishwashing machines, toilets, sinks, and refrigerators equipped with ice cube makers, which occasionally are the source of water leaks due to broken hoses, faulty water level detectors, and the like. Insurance companies have recently disclosed that water damage claims have exceeded fire damage claims. This emphasizes the need for preventive measures as would be provided by this invention. Since the invention does not require any electronics circuitry or complex mechanical devices to function, it provides a cost-effective and reliable means of turning off the source of water leakage.

DESCRIPTION OF PRIOR ART

There are numerous water leak detection systems, most of which involve the use of an electronic means for sensing the presence of fluids such as water. The sensor elements of such systems typically involve measuring the conductivity of the water and use such a detection means to energize a solenoid or other such device to turn off an associated water valve. Not only does the electronics circuitry add cost and reduced reliability, but also requires the presence of electrical power to function. If a water leak occurs coincidentally with an electrical power outage, the valve will fail to accomplish its purpose, unless auxiliary power is supplied.

There are several prior art patents that provide water shutoff protection utilizing a water sensor that changes physical properties when placed in contact with water, thereby activating a valve shutoff device. Upon review it will become evident that most of these patents are intended for use on water heaters. Installation of such shutoff devices requires plumbing skills such as cutting into the existing water source pipe and soldering the new valve device in place or installing the necessary threaded fittings to accommodate the new valve. In many locations it would involve hiring a licensed plumber to comply with local building codes. The cost and complexity of such an installation often is a deterrent to undertaking the project. As will be seen by the following disclosure the proposed water shutoff system of the present invention is intended for use on the indicated appliances such as clothes washing machines, etc. and can be easily installed. Since no knowledge of plumbing skills is required, this invention would lend itself to do-it-yourself installation.

One device described in U.S. Pat. No. 2,798,503, dated Jul. 9, 1957, issued to Carver et al, utilizes a water softenable link that dissolves when coming in contact with water leaking from a water heater into an associated drip pan. As described, the cable attaching the water softenable link to the shutoff valve must be positioned directly beneath the shutoff valve so that the softenable link can be anchored in the drip pan. While appropriate for this installation it would not provide the flexibility to be applicable on other applications.

Another device described in U.S. Pat. No. 3,920,031, dated Nov. 18, 1975, issued to Maxfield provides a water shutoff device associated with a water heater application. The water detection means involves the use of a water-soluble material held in compression by a spring. The water detection means is placed in a drip pan that surrounds base of the water heater such that, as water leaks from the faulty water heater, it will reach a level to dissolve the detection means which in turn releases a spring driven valve that is plumbed into the water supply line of the water heater.

There are numerous patents that describe the application of the pilot valve technology. One of the more prominent patents is U.S. Pat. No. 4,387,878 dated Jun. 14, 1983 and issued to Zuksusky. This patent describes the use of a flexible diaphragm, in conjunction with specifically sized apertures, to control the open or closed valve condition. The Zuksusky patent utilizes an electric solenoid to open or close the appropriate pilot aperture, thereby allowing fluid to flow or not flow through the valve assembly. The present invention utilizes a modification of the pilot valve configuration, without the solenoid requirement, and will be described in detail later.

U.S. Pat. No. 5,169,117 dated Dec. 8, 1992, issued to Huang shows applicable prior art to be cited in this application. This patent describes a means for opening and closing a pilot valve by moving magnets in such a manner to open or close the pilot aperture. The magnet movement is accomplished using a small drive motor and hence requires the use of electric power as opposed to the present invention that requires no electric power to operate.

Another device described in U.S. Pat. No. 5,632,302, dated May 27, 1997, and issued to Robert M. Lenoir, Jr. provides two different means of specifically dealing with water heater leakage. One means involves the use of an electrical sensor to detect the presence of water leakage specifically from a water heater in order to activate a solenoid to turn off an associated water valve located in the cold water input pipe of the water heater. A second described means involves the use of a thin, dissolvable strip, which is in tension, and dissolves in the presence of water thus releasing a spring mechanism which, in turn, activates a spring loaded valve specifically located in the cold water input pipe of a water heater. There are two basic drawbacks to this second means as described. First, the use of a standard ball valve in such an application requires the use of a spring-loaded valve with a very strong spring. Ball valves typically involve full contact seals such as O-rings on both the inlet and outlet sides of the rotating ball. These O-rings produce a great deal of pressure on the ball, thus requiring inordinate rotational torque to close the valve, making the valve reliability questionable. Second, the dissolvable strip as described in the invention is shown in tension. Most such materials, which might be used as described, are composed of a water soluble, crystalline structure that exhibits poor tensile strength, thus making it unreliable and subject to premature failure. As will be seen later, the present invention overcomes the above shortcomings and provides an easily installed system for water and, where applicable, non-water systems.

Yet another U.S. Pat. No. 6,024,116, dated Feb. 15, 2000, issued to Almberg et al, again deals specifically with water leak detection in water heater applications. It provides a water softenable latch that, when exposed to water, will release a valve mechanism from its open to closed state thus turning off the water supply. In addition the invention turns off the gas supply to the water heater.

U.S. Pat. No. 6,792,967, dated Sep. 21, 2004, issued to Franklin, the inventor herein, describes a water shutoff valve with leak detector that is designed to function primarily with such applications as clothes washing machines, dishwashing machines, toilets, sinks, and refrigerators equipped with ice cube makers. Although the valve described in the U.S. Pat. No. 6,792,967 patent accomplishes the objectives as described, it has two shortcomings that might be considered objectionable in certain operating situations. The first such shortcoming occurs after the valve has been set to a closed position as a result of a water leak being detected. After the leak has been repaired the valve must be reset to an open position to allow normal fluid flow to the applicable appliance. It has been found that in some situations pressing the main body of the valve in an axial direction to reset it to an open position causes what is commonly called a hydraulic lock. This hydraulic lock occurs as a result of trying to compress a liquid. In this case the liquid would be the water trapped between the water source valve and the shutoff valve to be reset. The simple solution to this problem is to turn off the water source valve and momentarily unthread the coupling between the water source valve and the shutoff valve thus relieving the hydraulic lock. It is believed that this may present a problem for those individuals who are not mechanically inclined. A second shortcoming was found in my original patent, namely, that the water shutoff valve required an ability to elongate in an axial direction when activated to a closed position. Thus the valve was restricted to use with flexible water lines that coupled the output of the shutoff valve to the applicable appliance. In most applications this would not be a problem, however in toilet installations, for esthetic reasons, it is often desirable to use a rigid, chrome-plated pipe to couple the output of an associated water source valve to the toilet tank. Obviously the shutoff valve described in U.S. Pat. No. 6,792,967 would not allow use in such an application. It is the goal the present invention to overcome the above shortcomings and to describe a valve system that utilizes a variation on proven pilot valve technology, in conjunction with the technology described in my earlier patent, to produce a more acceptable shutoff valve with leak detection capabilities.

Most prior art that was found addresses the subject of water leak conditions as they pertain to water heaters. The following described invention pertains more specifically for use with clothes washing machines, dishwashing machines, toilets, sinks, and refrigerators equipped with ice cube makers.

SUMMARY OF THE INVENTION

This invention provides a simple, reliable means of detecting and shutting off the source of most common water leaks involved with clothes washers, dishwashers, toilets, sinks, and refrigerators equipped with ice cube makers by utilizing a pilot operated shutoff valve in conjunction with a water sensor. Although the following invention description focuses primarily on those appliance applications listed above, which involve water leakage, it could likewise apply to other applications involving the use of other non-water fluids, where applicable. As will be seen later, the valve described in this invention utilizes a flexible diaphragm that allows water to flow from the valve's entry port to its exit port in normal operation but closes the water flow path when activated to its closed condition. The use of this pilot valve structure, in conjunction with a water sensor and activation mechanism, provides a compact, simple water shutoff device. The use of this valve does not preclude the use of other pilot valve configurations by those skilled in the art to accomplish the goals of this invention.

The water sensor described in this invention utilizes a water-soluble substance in a compression mode. Other methods for containing the water-soluble material, for example, in a bending, torsion, or tension mode, as devised by those skilled in the art, should not detract from the spirit of this invention. The water-soluble substance could be composed of such materials as sugar, salt, or the like. These materials exhibit relatively high strength in compression when dry and lose most if not all of that strength when exposed to a fluid such as water. As will be shown later with regard this invention, a spring maintains pressure against the water-soluble substance and will initiate a closure of the associated valve when the water-soluble substance dissolves.

DESCRIPTION OF THE DRAWINGS

FIG. 1 shows a typical clothes washing machine installation with water sensors and shutoff valves located at the inlets to the hose lines.

FIG. 1A shows an enlargement of an area of FIG. 1 to provide a more detailed depiction of the shutoff valve installation.

FIG. 2 shows a typical toilet installation with a water sensor and shutoff valve located at the inlet to the rigid pipe that passes water to the toilet reservoir tank. The rigid pipe can be replaced by an appropriate flexible hose.

FIG. 3 shows a partial cutaway of a typical sink installation with a water sensor and shutoff valve located at the inlet to the flexible hose line.

FIG. 8 shows a cross-sectional side view of the shutoff valve with an input adapter for use with a standard compression fitting arrangement and a typical, threaded output for use with a flexible hose or rigid tubing connection. The valve is shown in an open condition.

FIG. 9 shows a cross-sectional end view of the shutoff valve with the outlet pilot aperture in an open condition which allows fluid to flow through the valve.

FIG. 10 shows the same cross-sectional side view of the shutoff valve shown in FIG. 8 but with the valve in a closed condition.

FIG. 11 shows the same cross-sectional end view of the shutoff valve of FIG. 9 with the outlet pilot aperture shown in a closed condition.

DETAILED DESCRIPTION

Figure 4:
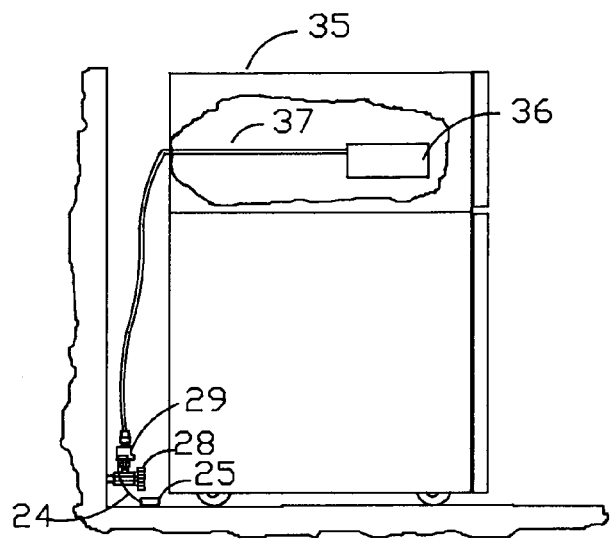
FIG. 4 shows a partial cutaway of a typical refrigerator installation equipped with an automatic ice maker device, along with a water sensor and shutoff valve connected to a water source via a hose or tubing means.

The following FIGS. 1, 1A, 2, 3, and 4 are provided to show typical installations in which the water shutoff valve of the present invention might be utilized. FIG. 1 shows a clothes washing machine 20 as it might be installed with its hot and cold water connections. Valves 21 and 21a represent the hot and cold water valves respectively, normally found on such appliance installations, providing the supply water to the clothes washing machine 20. Attached to these valves 21 and 21a are the shutoff valves 22 and 22a to be described herein. Hoses 23 and 23a provide the water connections between the shutoff valves and the hot and cold water inputs to the clothes washing machine. Cable assemblies 24 and 24a are used to couple the water sensor assemblies 25 and 25a to the shutoff valves 22 and 22a respectively. FIG. 1A is an enlargement of the above mentioned valve 21, shutoff valve 22, cable assembly 24 and hose 23, and is provided to visually clarify the actual connections. A typical connection that might be used in a dish washer application is not shown since it closely resembles that used on the clothes washing machine with the exception that only one hose connection, namely the hot water line, is used.

FIG. 2 shows a toilet installation 26 with its reservoir tank 27. A typical installation has a valve 28 that allows a means for turning on and off the source of water necessary for operation. Connected to the top outlet of valve 28 is shutoff valve 29. Although the internal structure of valve 29 is the same as the previously mentioned shutoff valves 22 and 22a, it differs in the fact that the hose connections of valves 22 and 22a are replaced by smaller, threaded connections appropriate for that installation. Rigid pipe 30 provides the necessary coupling between the top of shutoff valve 29 and the bottom of the reservoir 27. It should be understood rigid pipe 30 could be replaced by a flexible hose. Cable assembly 24 provides the necessary coupling between the shutoff valve 29 and the water sensor assembly 25.

FIG. 3 shows a partial cutaway view of a typical sink installation in which a sink 31 is mounted in a cabinet 32 with the associated hot and cold faucets 33. Although the side view shows only one faucet connection, it should be understood that the other faucet connection, either hot or cold, is identical to that shown in the foreground. Valve 28, shutoff valve 29, cable assembly 24, and water sensor assembly 25, are identical to that previously described in FIG. 2 and, hence, carry the same number designations. Hose 34 provides the necessary coupling between the top of the shutoff valve 29 and the faucet configuration 33.

FIG. 4 shows a typical refrigerator 35 installation with a partial cutaway view of the ice cube maker 36 as it might be located within the freezer compartment. The tubing 37 connects the ice cube maker to the shutoff valve 29 that is in turn connected to the water valve 28. Cable assembly 24 connects the shutoff valve to the water sensor 25.

Figures 5, 6:
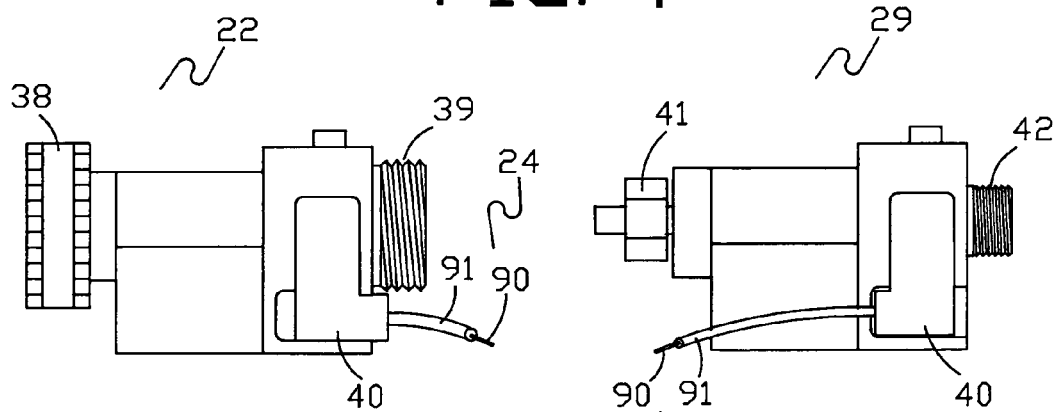
FIG. 5 shows the external side view of the shutoff valve used with hose connections on typical dishwashing machine or clothes washing machine installations.
FIG. 6 shows the external side view of the shutoff valve with typical fittings for toilet, refrigerators equipped with ice makers, and sink installations.

FIG. 5 shows the outside structure of the shutoff valve 22 shown in FIGS. 1 and 1a. Coupling sleeve 38 is internally threaded, and independently rotatable as might be found on a standard water hose. It provides a means of fastening the shutoff valve to a standard water faucet or water pipe equipped with a hose thread. Cable assembly 24, with its internal cable 90 and tubing 91, is used to couple the shutoff valve to the associated water sensor assembly, to be described in detail later. Threaded outlet 39 for the shutoff valve 22 provides a means for connecting a hose to the shutoff valve. Such a hose is described in FIG. 1 as items 23 and 23a.

FIG. 6 shows the outside structure of the shutoff valve 29 shown in FIGS. 2 through 4. As previously mentioned, the only difference between this shutoff valve 29 and that of shutoff valves 22 and 22a is the inlet and outlet connection means. A small, internally threaded and rotatable sleeve 41 provides a means of connecting the shutoff valve 29 to a water source often using a compression fitting or rubber grommet, not shown. The standard installation would typically attach the inlet of the shutoff valve 29 to the threaded outlet of a valve 28. Threaded outlet 42 provides a means of attaching the flexible hose 34 to the appropriate appliances as shown in FIGS. 3 and 4 or to the rigid pipe 30 in FIG. 2. In both FIGS. 5 and 6 item 40 represents the latching mechanism used to determine whether the shutoff valve is to be in an open or closed condition.

Figure 7:
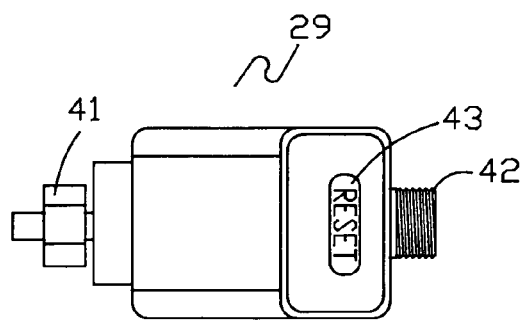
FIG. 7 shows an external front view of the shutoff valve with typical fittings for toilet, refrigerators equipped with ice makers, and sink installations.

FIG. 7 shows the front view of shutoff valve 29 and displays the reset button 43. This reset button is normally depressed and latched in that position when the shutoff valve 29 is open, allowing fluid flow through the valve body. If a water leak is detected and the shutoff valve is placed in a valve-closed condition the reset button 43 will extend outward from the valve body. This will provide an indication that the shutoff valve has been tripped to a closed position and, in addition, provide a means of resetting the valve to an open condition once the water leak has been repaired.

FIG. 8 is a cross sectional view of shutoff valve 29 shown in a valve open condition in which fluid is flowing through the shutoff valve. From this point on, for simplification, the word valve will be equivalent to shutoff valve unless stated otherwise. The fluid path is from left to right as shown by the flow arrow. Fluid enters the valve 29 at the input adapter 44 that is threaded into the valve body 45. The threaded coupling 41 of FIGS. 6 and 7 is not shown, but if shown would appear over the input adapter 44. The input adapter 44 allows different size tubing to be installed depending on the size of the valve 28 output (FIGS. 1 through 4) to which the valve 29 is to be coupled. There are two paths for fluid flow through the valve 29, namely, the main fluid flow and the restricted fluid flow. The main flow represents the majority of fluid that flows through the valve 29. The restricted flow is a small portion of the total fluid flow through the valve 29 and has a primary purpose of controlling the opening and closing of the main flow using the pilot apertures to be described. As shown, the main fluid flow is up and over valve seat 46, downward between the valve seat 46 and alignment probe 47 portion of insert 48, and through valve output 59. In addition there is a restricted fluid flow through filter holes 49, that are part of the diaphragm 50, and then into reservoir 67. Channel 51 of insert 48 provides a common flow path that couples all the filter holes 49, allowing them to have a fluid connection to the input pilot aperture 52. Next, the restricted fluid flow passes through an input pilot aperture 52, through hole 53, channel 54, hole 55, then past the clearance between the valve body 45 and magnet 56 enclosure 80, and finally through an output pilot aperture 57 of insert 58 to the valve output 59. The above flow path comprises the fundamental part of a pilot valve that allows it to function as it does. Although the pilot valve technology is well known in the art and accomplished using variations on a basic theme, the fundamental principle involves controlling pressure differentials to open or close the diaphragm 50 portion of valve 29. Returning to the valve 29 of FIG. 8, the diaphragm 50 is normally composed of a rubber material that flexes at point 60 allowing it to move upward as shown or to move downward to close against the valve seat 46 as shown in FIG. 10. The periphery of diaphragm 50 is captured between the valve body 45 and the insert 61 at point 62. The key element in determining whether the diaphragm opens or closes against the valve seat 46 is whether outlet pilot aperture 57 is open or closed by magnet 56 moving downward to place the seal element 63 against outlet pilot aperture 57. This situation will be discussed in detail later. As shown in FIG. 8 the restricted fluid passes through the open outlet pilot aperture 57 to join the main fluid flow. The aperture openings 52 and 57 are sized such that the input pilot aperture 52 is smaller than the output pilot aperture 57. Because of this, a pressure differential is established between the lower side of diaphragm 50a and the reservoir 67, since more fluid can escape via output pilot aperture 57 than can be supplied via input pilot aperture 52. In normal operation the diaphragm 50 and insert 48 will move up and down as water demand is varied at the valve output 59. This water demand will depend on the appliance valve, such as a sink faucet, being on or off. As long as outlet pilot aperture 57 remains open diaphragm 50 will flex upward each time an appliance valve is opened, thus allowing fluid passage through the valve 29. It will be noted that O-ring 65 provides a fluid seal between valve body 45 and insert 61. Likewise, O-ring 68 provides a fluid seal between valve body 45 and plug 69. Spring 70 provides a small force to aid in the closure of diaphragm 50 against valve seat 46. Plate 71 is held in place by screws 72 and functions to retain insert 61 and plug 69. Alignment probe 47 functions to ensure that the surface of diaphragm 50 is in proper alignment with the valve seat 46 during closure.

FIG. 9 shows a cross sectional end view of valve 29 in the same relative vertical position as shown in FIG. 8. Magnet 56 and seal 63 are again shown in the upward position allowing fluid to flow through outlet pilot aperture 57. The magnet 56 and seal 63 are encased in the enclosure 80 which has an opening 64 that allows the seal 63 to contact the tip of outlet pilot aperture 57 when magnet 56 is moved to its lower position. Magnets 78 and 79 are shown encased in the extensions 74 and 75 respectively of the reset button 43 forming a reset structure. Springs 76 and 77 provide a downward force against the magnets and thus against the reset extensions 74 and 75. The reset button 43 and its extensions are locked in the position shown by pin 83 that is captured by latch arm 84. Latch arm 84 is part of the latching mechanism 40 that will be explained in detail later. As shown, the polarity of magnets 78 and 79 are opposite to the polarity of magnet 56. This arrangement allows the magnet fields of the three magnets to interact so as to cause magnet 56 to follow the position of magnets 78 and 79. It would be possible to eliminate one magnet, say 78, and still have the relative movement between magnets 56 and 79. It was found, however, that by providing a second magnet 78 the reliability of the system was enhanced, largely because of the reduced friction of magnet 56 and its enclosure 80 rubbing against the adjacent wall in which they move up and down. Essentially magnet 56 could be considered as floating between the two outside magnets 78 and 79. In addition, because the magnets 78 and 79 are encased in reset button 43 extensions 74 and 75, the attractive force that would normally pull these magnets toward magnet 56 is restricted by the rigidity of the extensions. In this way the friction between the total reset button structure and the walls of the valve body is minimized. As will be seen later this lower friction reduces the force necessary to activate the latching mechanism 40.

FIG. 10 shows a side, cross sectional view of the valve 29 in a closed condition. Fluid flow through the valve is now blocked by diaphragm 50 and insert 48 pressing against the valve seat 46. The force necessary to hold these elements against the valve seat is a result of magnet 56 and its associated seal 63 closing the fluid flow path through output pilot aperture 57. Since the pressure at the output 59 of valve 29 is lower than the input fluid pressure to the valve, the fluid that flows into the reservoir 67 via filter holes 49 and aperture 52 will cause an increase in pressure against the top of insert 48, thereby pressing the diaphragm 50 firmly against the valve seat 46.

FIG. 11 is once again a cross sectional, end view of valve 29 showing the position of magnet 56 and seal 63 now pressing against the output pilot aperture 57 thereby closing it to fluid flow. In this view it is assumed that a water leak has been detected by the detection means to be described later. As a result the latch arm 84 of latching mechanism 40 releases pin 83, causing the reset extensions 74 and 75, and the reset button 43 to move downward. Springs 76 and 77 produce the force necessary to cause this movement. Plate 73 provides a stop that limits the movement of reset button 43. Since magnets 78 and 79 are now also positioned lower, their magnetic fields cause magnet 56, seal 63, and enclosure 80 to follow the downward movement. Thus it can be seen that by moving the reset structure up or down, magnets 78 and 79 will likewise move in a manner causing magnet 56, seal 63, and enclosure 80 to follow, thereby opening or closing the output pilot aperture 57. This in turn, through the pilot valve action, causes valve 29 to open or close the fluid communication between its input and output. Although the opening and closing of the output pilot aperture 57 could be accomplished by means other than a magnetic arrangement, it would require a shaft with an O-ring seal that could provide a path for subsequent water leakage.

Figure 12:
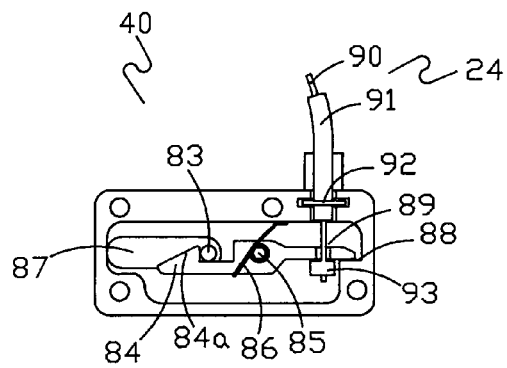
FIG. 12 shows an internal view of the valve latch mechanism when the valve is in an open condition.

FIG. 12 is a top view of latching mechanism 40 with the top cover removed. Latch pin 83 has a force from springs 76 and 77 (FIG'S. 9 and 11) acting to try to move it to the left. Latch arm 84 holds latch pin 83 in place. Latch arm 84 pivots about pin 85 and is biased in a clockwise direction by a torsion wire spring 86. Cable assembly 24 includes an internal cable 90 that passes through slot 89 and has a retainer ring 93 fastened to the end of internal cable 90 allowing the retainer ring 93 to apply a rotational force on latch arm 84 when internal cable 90 is pulled upward. Lock ring 92 holds the cable tubing 91 from moving axially relative to the latch mechanism yet allows one to rotate relative to the other. As shown, the latching mechanism 40 is in a standby condition with the valve 29 in an open condition.

Figure 13:
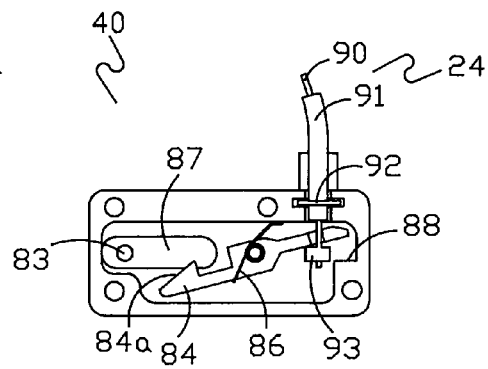
FIG. 13 shows an internal view of the valve latch mechanism when the valve is in a closed condition.

FIG. 13 is again a top view of latching mechanism 40 but with the latch mechanism shown in a tripped condition, as would be the case when a water leak has been detected. As will be explained later, when the leak detector senses a water leak condition internal cable 90 will be pulled within the cable tubing 91 causing retainer ring 93 to move toward the lock ring 92. When this happens latch arm 84 is rotated in a counter clockwise direction, thereby releasing latch pin 83 to move to the left within slot 87. As previously described, this releases the reset structure composed of items 43, 74, and 75 to move in a manner that will cause closure of the outlet pilot aperture 57, thereby causing the valve 29 to become closed to fluid flow. When the leak has been repaired, the leak detector can be reset by replacing the water sensor cartridge as will be described later. During the process of replacing the water sensor cartridge, the internal cable 90 will be forced to move within the cable tubing 91 allowing the latch arm 84 to rotate clockwise, back to its original position with the right most portion of latch arm 84 resting against ledge 88. When the reset button 43 is pressed, the latch pin 83 will slide within slot 87 and will rotate latch arm 84 slightly in a counter clockwise direction as it moves up the incline portion 84a of latch arm 84 until the latch pin 83 reaches a point where the latch pin 83 will be recaptured by latch arm 84 and latched in place. It should be noted that, although not shown, the latching mechanism 40 can be installed on valve 29 in the position shown or flipped over to allow the cable assembly 24 to be routed in the opposite direction. There is a comparable slot opposite slot 87 that allows latch pin 83 to enter the latching mechanism 40 housing. The purpose in providing this feature is to allow more convenient routing of the cable assembly 24 depending on whether the latching structure is installed in a water hose application, i.e. clothes washing machine, or an alternate application such as under a sink or toilet.

Figures 14, 14A:
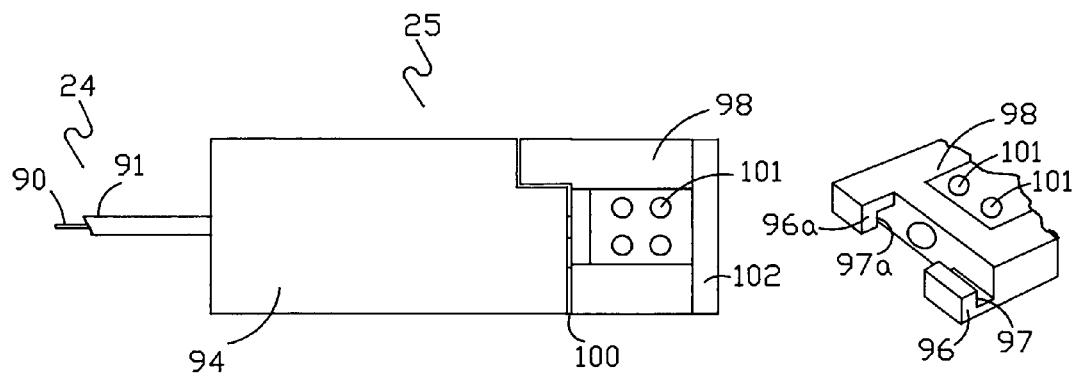
FIG. 14 shows an external, top view of the water sensor assembly.
FIG. 14A shows a partial isometric view of the water sensor cartridge.

FIG. 14 is the top view of the water sensor assembly 25. The upper section 94, along with the lower section 95 as viewed in FIG. 15, form the main enclosure of the water sensor assembly 25. This main enclosure is connected to the water sensor cartridge 98 by a twist-lock coupling. FIG. 14A shows a partial isometric view of the water sensor cartridge 98 as would be seen at the interface 100 as indicated in FIG. 14 between the upper section 94 of water sensor assembly 25 and the water sensor cartridge 98. Locking segments 96 and 96a will interlock with comparable segments (not shown) that are part of the upper and lower sections 94 and 95 of water sensor assembly 25. The lines 97 and 97a denote the inner surfaces of the cartridge 98 that interlock with the corresponding locking surfaces (not shown) of the upper and lower sections 94 and 95. This interlocking configuration can be better seen in FIG. 15 where segments 96 and 99 are shown mating at surface 97. Thus it can be seen that replacement of the water sensor cartridge 98 is simply a matter of twisting and removing the water sensor cartridge 98 relative to the upper and lower sections 94 and 95 of water sensor assembly 25. A replacement cartridge can be installed by reversing the process. With regard to the water sensor cartridge 98, holes 101 allow fluid access to a water-soluble element 108 (FIG. 16) contained within the sensor cartridge 98. Item 102 is an end cap that captures the water-soluble element within the sensor cartridge 98. Cable assembly 24 is routed to the latching mechanism 40 as previously described.

Figure 15:
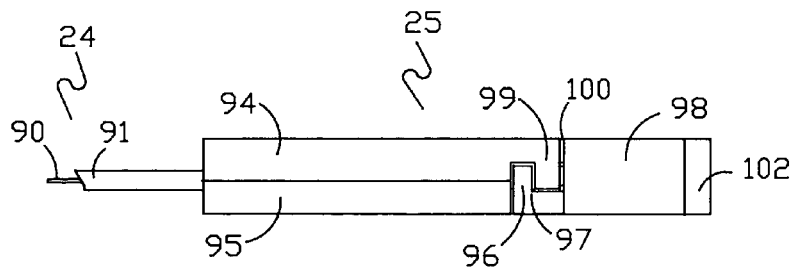
FIG. 15 shows an external, side-elevation view of the water sensor assembly.

FIG. 15 is a side-view of the upper 94 and lower 95 sections of the leak detector assembly 25. These sections are fastened together as an integral assembly. As previously mentioned, this view more clearly shows how the interlocking surfaces provide a means to couple the water sensor cartridge 98 to the upper and lower sections 94 and 95 of the water sensor assembly 25.

Figure 16:
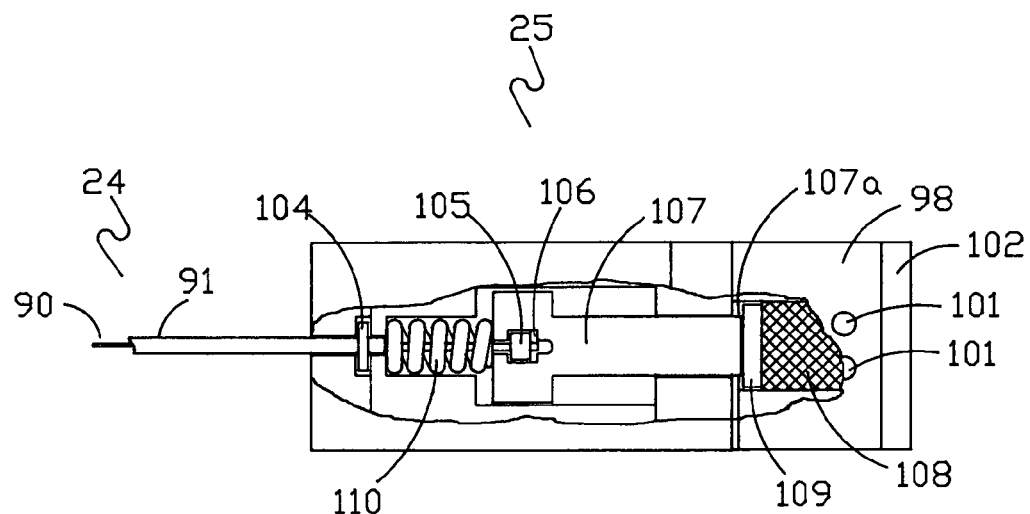
FIG. 16 shows a top, cutaway view of the water sensor assembly in a standby state.

FIG. 16 is a top, cutaway view of the water sensor assembly 25. The internal cable 90 and tubing 91 enter the water sensor assembly 25 at the left end. Tubing 91 is held in axial position relative to the water sensor assembly 25 by lock ring 104. Retainer ring 105 is fastened to the end of internal cable 90 and is located within a cavity 106 of plunger 107. As shown, spring 110 exerts a rightward force against plunger 107. The right end 107a of plunger 107 presses against plate 109 that acts to more evenly distribute the existing force against the water-soluble element 108. Since the water-soluble element 108 has considerable strength in compression the plunger 107 will be held in the position shown.

Figure 17:
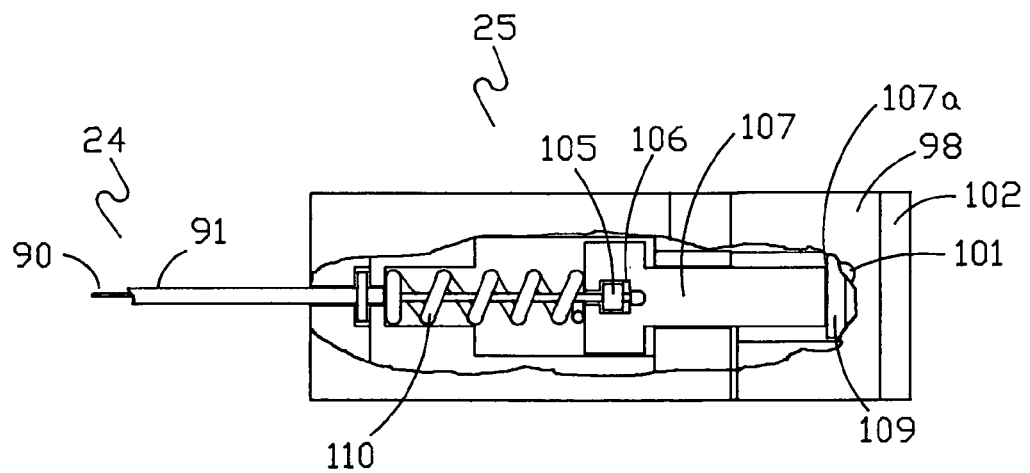
FIG. 17 shows the top, cutaway view of the water sensor assembly in an activated state.

FIG. 17 is a cutaway view of the water sensor assembly 25 after a water leak has been detected. When the water-soluble element 108 was exposed to water, or other appropriate fluid, it dissolves allowing spring 110 to force plunger 107 and plate 109 in a rightward direction. In doing so, retainer ring 105 that is fastened to internal cable 90, exerts a rightward force on internal cable 90, thereby causing it to move within the cable tubing 91. This movement causes the latch mechanism 40, previously described, to trip the valve 29 to a closed condition. Once the source of the water leak is repaired and any water leakage removed, the water sensor assembly 25 can be restored to a normal status by simply twisting and withdrawing the water sensor cartridge 98 to remove it from the upper and lower sections of the water sensor assembly 25. A new cartridge can be installed by reversing the procedure. Of course it is also possible to make provisions for the water-soluble element 108 to be replaced within the cartridge 98 without having a removable cartridge.

One of the primary advantages of the described invention relative to the prior art is the ease with which it can be installed without disrupting the existing water supply lines or the water connections to the applicable appliances. When installing the described shutoff valve and sensor to the water sources for a clothes washing machine, the first step is to turn off the faucets or valves 21 and 21a controlling the hot and cold water to the clothes washing machine as viewed in FIG. 1. Next, the washing machine hoses 23 and 23a are disconnected from the hot and cold water faucets or valves 21 and 21a. One of the described is shutoff valves 22 is now threaded onto the hot water faucet and another shutoff valve 22a is threaded onto the cold water faucet. Then the previously removed washing machine hoses 23 and 23a are threaded onto the threaded outlets of the hot and cold shutoff valves 22 and 22a respectively. The sensor assemblies 25 and 25a would now be placed on the floor adjacent to the washing machine or in a location that would optimize the possibility of detecting any future water leakage. Once the water source faucets or valves 21 and 21a are opened to allow flow to the washing machine the installation is complete.

In summary, the foregoing disclosure describes a pilot operated valve system having a water sensor assembly and an activation mechanism, which provides a means to turn off a water supply when a water leak is detected. This disclosure focuses primarily on specific applications such as clothes washing machines, dishwashing machines, toilets, sinks, and refrigerators equipped with ice cube makers, but could apply to appropriate, non-water, fluid-handling applications. Because of its design this valve system requires no electrical power to function. It should be understood, however, that anyone skilled in the art might provide a switching means to detect when the valve has been shut off, and utilize the switching means to activate an audible or visual alarm. Likewise, the water sensor and associated activation cable could be replaced by an electrical solenoid, controlled by a separate electronic water sensing and control system. In addition, it should be understood that the above valve description should not preclude the incorporation of the valve shutoff system as an integral part of the manual shut off valves which have been designated by items 21, 21a, and 28 in FIGS. 1 through 4. In addition it should be noted that the pilot valve design, described herein, avoids many of the shortcomings associated with previous designs. Two such shortcomings are the previously described hydraulic lock condition that can exist, and the requirement that the valve be used in conjunction with flexible hose coupling only. This was due to the fact that the prior art valve had to physically elongate upon activation, thus precluding the use of rigid tubing to couple the valve to any external appliances. Although a particular pilot valve design has been used in the description of this invention, it should be understood that other pilot valve configurations could be used without departing from the spirit of this invention. The description of this invention is illustrative and not limiting; further modifications will be apparent to one skilled in the art, in the light of this disclosure and the appended claims.

What is claimed is:

1. A pilot operated shutoff valve system with leak detector for automatically shutting off a water supply to appliances such as a clothes washing machine, dish washing machine, sink, toilet, or refrigerator equipped with an ice maker, comprising;
    a valve body having an inlet opening and an outlet opening which are in fluid communication, said inlet opening being connected to said water supply and said outlet opening being connected to any of the above-mentioned appliances;
    a main fluid flow through said valve body and a restricted fluid flow through said valve body;
    a sealing member movable within said valve body between an open position wherein the sealing member does not block main fluid flow, and a closed position wherein the sealing member blocks main fluid flow;
    a input pilot aperture for the restricted fluid flow in fluid communication with a reservoir, the output of which is in communication with an output pilot aperture that is of larger area than the input pilot aperture;
    a spring loaded latched assembly which in the open position allows restricted fluid flow through said output pilot aperture thereby allowing said sealing member to open which allows main fluid flow through said valve body, and when in the closed position blocks restricted fluid flow through the output pilot aperture causing said sealing member to block main fluid flow through said valve body;
    a latching mechanism which in the closed position restricts movement of said spring loaded latched assembly;
    a water sensor assembly having a water-soluble element therein;
    a cable connecting said water sensor assembly with said latching mechanism;
    and
    actuator means within said water sensor assembly which moves said latching mechanism to an unlatched position when said water-soluble element dissolves whereby the unlatched position of said latching mechanism releases said spring loaded latched assembly which causes restricted fluid flow through said output pilot aperture to be blocked, thereby causing said sealing member to block main fluid flow through said valve body.

2. The shutoff valve system of claim 1 wherein:
said water-soluble element is contained in a cartridge that is a detachable part of said water sensor assembly.

3. The shutoff valve system of claim 1 wherein:
the water-soluble element is in a compression mode.

4. The shutoff valve system of claim 1 wherein:
said cable pulls against a spring loaded latch element during valve closure.

5. The shutoff valve system of claim 1 wherein:
said sealing member is an flexible diaphragm.

6. The shutoff valve system of claim 1 wherein:
an external force is applied to said spring loaded latched assembly to move it to a position which allows the latching mechanism to return to a position which restricts the spring loaded latched assembly, thereby allowing restricted fluid flow through said outlet pilot aperture allowing said sealing element to open which permits main fluid flow through said shutoff valve body.

7. The shutoff valve system of claim 1 wherein:
the spring loaded latched assembly contains at least one magnetic element that acts in conjunction with another magnetic element which moves in conjunction with an attached sealing element to block restricted fluid flow through said outlet pilot aperture.

8. The shutoff valve system of claim 1 wherein:
said actuator means has at least one spring which expands as said water-soluble element dissolves.

9. The shutoff valve system of claim 8 wherein:
the expanding spring moves a plunger attached to the end of said cable.

10. The shutoff valve system of claim 1 wherein:
said cartridge containing said water-soluble element is replaceable.

11. The shutoff valve system of claim 10 wherein:
said water-soluble element is replaceable.

12. The shutoff valve system of claim 1 wherein:
said shutoff valve system is incorporated as an integral part of a standard water valve normally used to manually turn on and off the water supply to said appliances.

* * * * *